US007766787B2

(12) United States Patent
Liu

(10) Patent No.: US 7,766,787 B2
(45) Date of Patent: Aug. 3, 2010

(54) HAND-HELD ROTATING POWER TOOL

(75) Inventor: Chien-Tsung Liu, Taichung Hsien (TW)

(73) Assignee: Wellcam Machinery Corp., Sheng Kung Hsiang, Taichung Hsien (TW)

( * ) Notice: Subject to any disclaimer, the term of this patent is extended or adjusted under 35 U.S.C. 154(b) by 519 days.

(21) Appl. No.: 11/870,599

(22) Filed: Oct. 11, 2007

(65) Prior Publication Data

US 2009/0098975 A1 Apr. 16, 2009

(51) Int. Cl.
*F16H 57/08* (2006.01)

(52) U.S. Cl. ........................................................ 475/331

(58) Field of Classification Search ................. 475/337, 475/346, 347

See application file for complete search history.

(56) References Cited

U.S. PATENT DOCUMENTS 5,269,733 A * 12/1993 Anthony, III ................ 475/331

2002/0094907 A1* 7/2002 Elger ......................... 475/331

* cited by examiner

*Primary Examiner*—Sherry L Estremsky
*Assistant Examiner*—Edwin A. Young
(74) *Attorney, Agent, or Firm*—patenttm.us

(57) ABSTRACT

A rotating power tool has a transmission assembly having a transmission casing, a common annulus, at least two planetary gear assemblies and a thrust washer assembly. The common annulus is tubular, is mounted securely in the transmission casing and has an inner surface and multiple teeth. The planetary gear assemblies are connected in series in the common annulus, and each planetary gear assembly has a sun gear, a planet carrier and at least three planetary gear assemblies. The planet carrier is an annular bracket. The planetary gear assemblies are mounted around and engage a sun gear and the teeth in the common annulus. The thrust washer assembly is mounted between adjacent planetary gear assemblies. Consequently rotation of the transmission assembly is smooth and stable. The thrust washer assembly damps reactive force to prevent damage and guarantee normal operation of the hand-held rotating power tool.

3 Claims, 5 Drawing Sheets

HAND-HELD ROTATING POWER TOOL

BACKGROUND OF THE INVENTION

1. Field of the Invention

The present invention relates to a rotating power tool, and more particularly to a hand-held rotating power tool having a transmission assembly that guarantees normal operation and isolates any reactive force.

2. Description of Related Art

With reference to FIGS. 4 and 5, a hand-held rotating power tool (60) can be mounted on an articulated arm (70) and typically has two ends, a power unit (61) and a head (62). The power unit (61) is mounted in one end of the hand-held rotating power tool (60), supplies rotating power and has an armature. The head (62) is mounted rotatably in the other end of the rotating power tool (60) and allows a tip or a bit to be attached coaxially to the head (62). Generally, the head (62) is rotated by a transmission assembly mounted between the power unit (61) and the head (62). The transmission assembly comprises at least one planetary gear assembly. The planetary gear assembly comprises a sun gear, a planet carrier, two planetary gears and an annulus. The sun gear is connected coaxially to, protrudes from and is rotated by the armature. The planet carrier is mounted rotatably around the sun gear and is attached to and rotates the head (62). The planetary gears are mounted rotatably on the planet carrier opposite to each other and engage the sun gear. The annulus is stationary, is mounted around the planetary gears and has a toothed inner surface. The toothed inner surface engages the planetary gears and causes the planet carrier to rotate as the planetary gears are rotated by the sun gear.

However, the planetary gears are susceptible to becoming unstable during operation especially after extensive use and even modest gear wear and can be damaged easily. Furthermore, any longitudinal reactive force transmitted from the head (62) will be transmitted directly to the power unit (61). Therefore, frequent maintenance is needed to ensure normal operation of the hand-held rotating power tool (60), which is time consuming and inconvenient.

To overcome the shortcomings, the present invention provides a hand-held rotating power tool (60) to obviate or mitigate the aforementioned problems.

SUMMARY OF THE INVENTION

The main objective of the present invention is to provide a hand-held rotating power tool having a transmission assembly that guarantees normal operation and isolates any reactive force.

The hand-held rotating power tool in accordance with the present invention for a hand-held rotating power tool has a transmission casing, a common annulus, at least two planetary gear assemblies, a thrust washer assembly and a isolating bearing assembly. The common annulus is tubular, is mounted securely in the transmission casing and has an inner surface and multiple teeth. The planetary gear assemblies are connected in series in the common annulus, and each planetary gear assembly has a sun gear, a planet carrier and at least three planetary gears. The planet carrier is an annular bracket. The planetary gears are mounted around and engage a sun gear and the teeth in the common annulus. The thrust washer assembly is mounted between adjacent planetary gear assemblies. Consequently rotation of the transmission assembly is smooth and stable. The thrust washer assembly damps reactive force to prevent damage and guarantee normal operation of the hand-held rotating power tool.

The bearing assembly is mounted adjacent to one of the planetary gear assemblies and is capable of isolating reactive force transmit from the head during the rotating power tool is working to avoid damage and guarantee ordinary operation of the rotating power tool.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
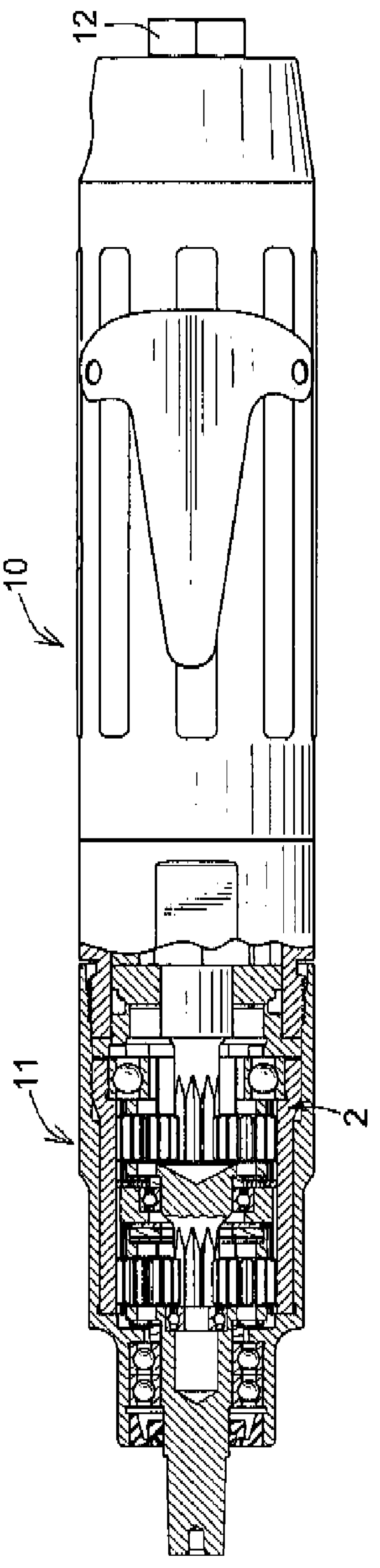
FIG. 1 is a side view in partial section of a hand-held rotating power tool with a transmission assembly in accordance with the present invention.
Figure 2:
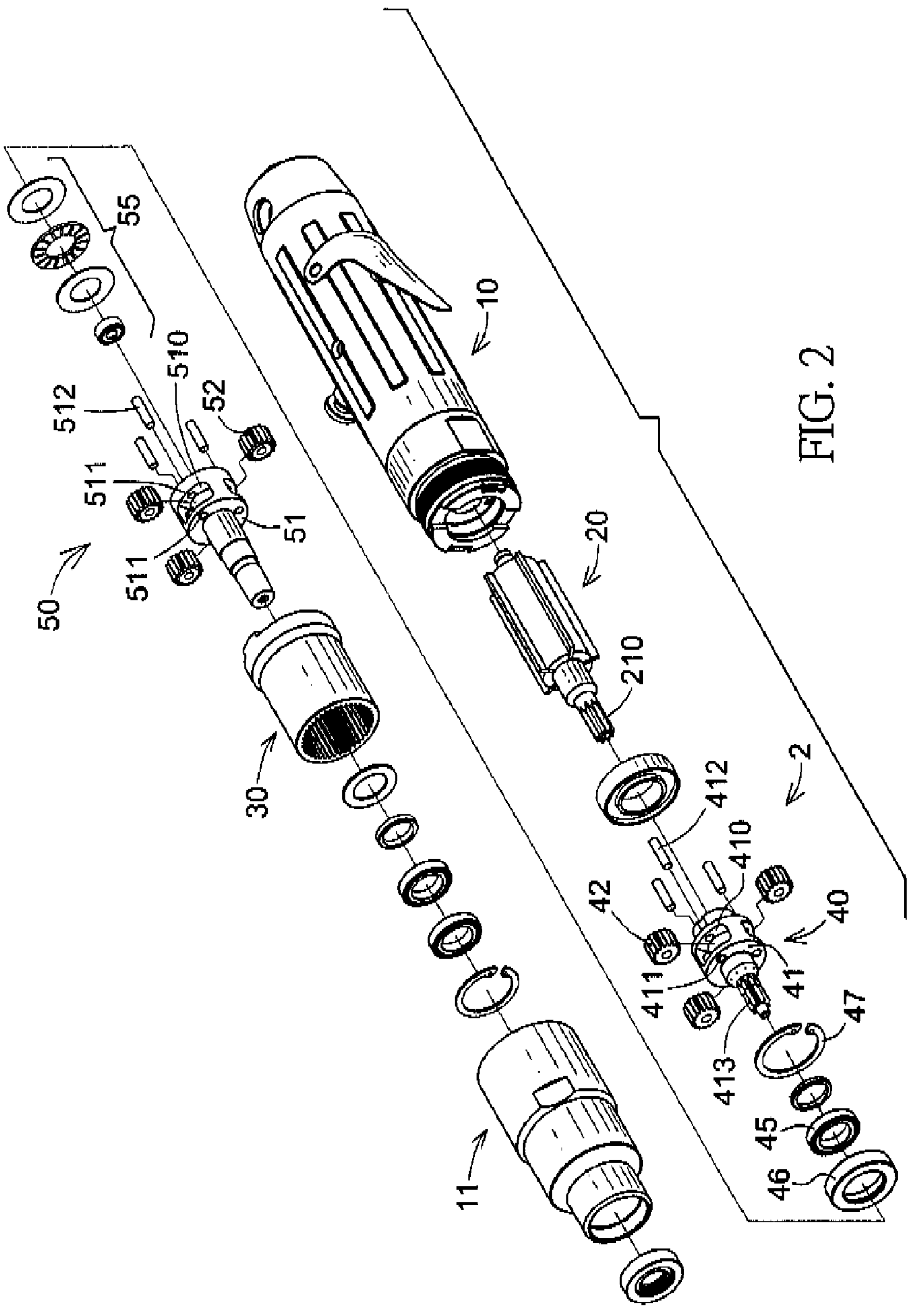
FIG. 2 is an exploded perspective view of the transmission assembly in the hand-held rotating power tool in FIG. 1.
Figure 3:
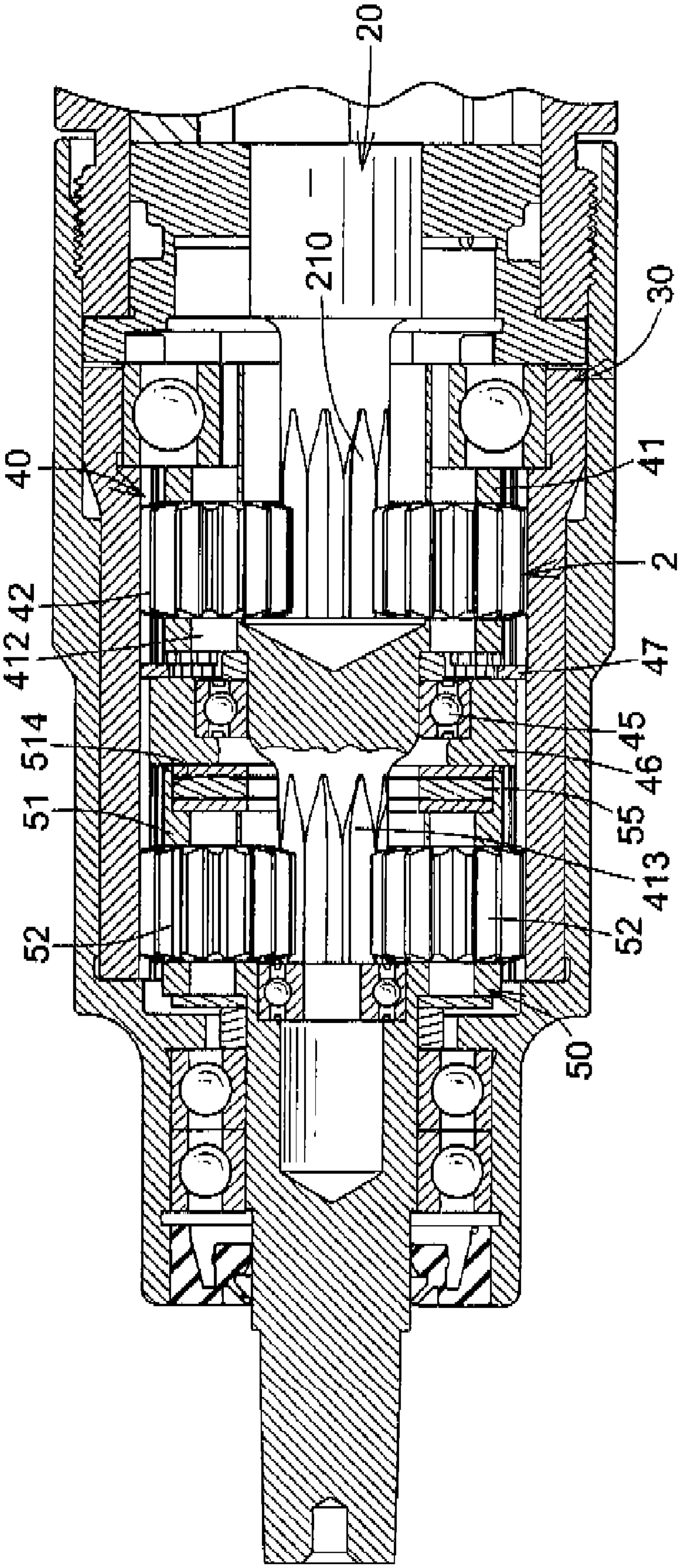
FIG. 3 is an enlarged side view in partial section of the transmission assembly FIG. 1 mounted in the hand-held rotating power tool.
Figure 4:
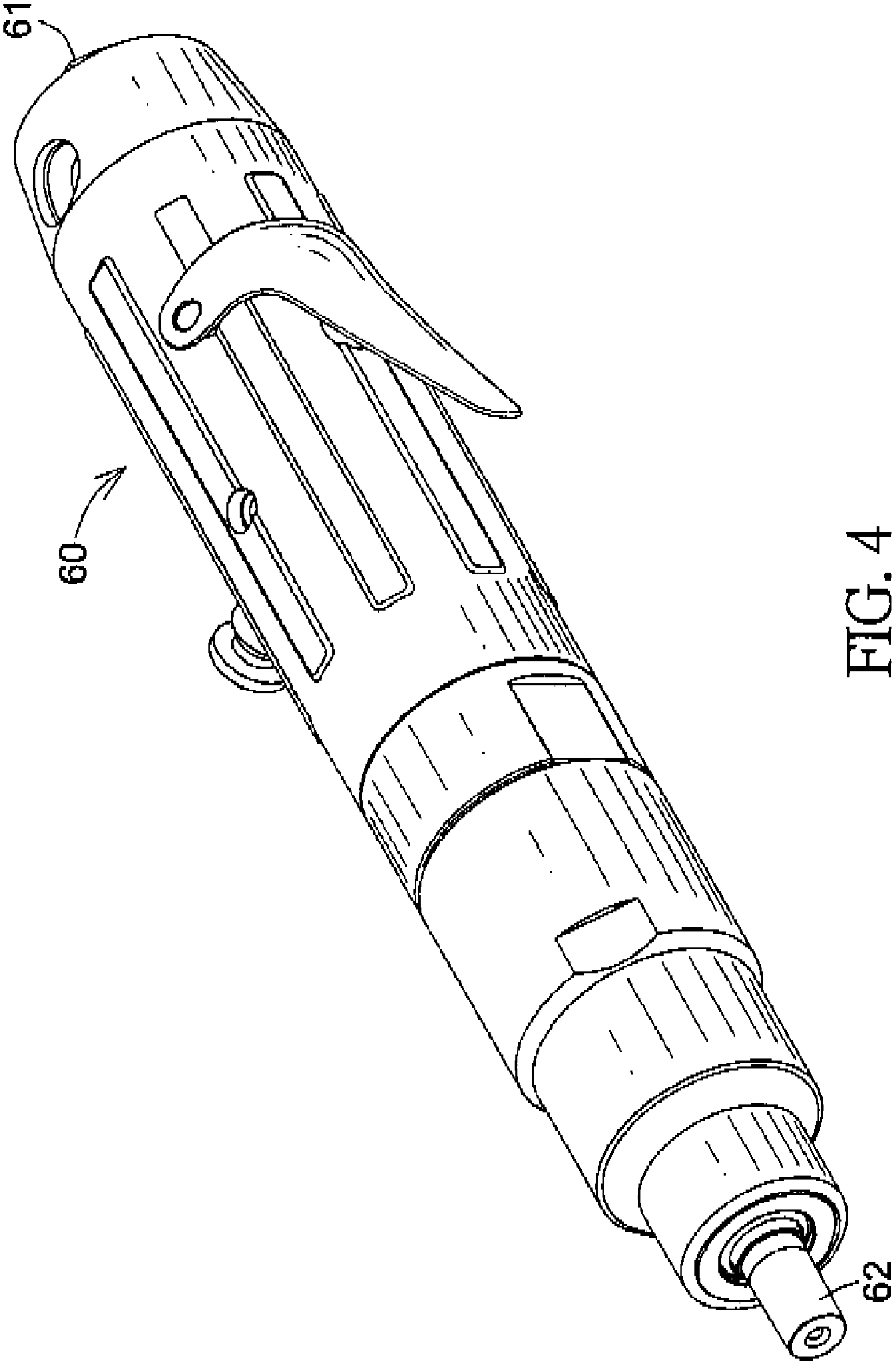
FIG. 4 PRIOR ART
FIG. 4 is a perspective view of a conventional hand-held rotating power tool in accordance with prior art.
Figure 5:
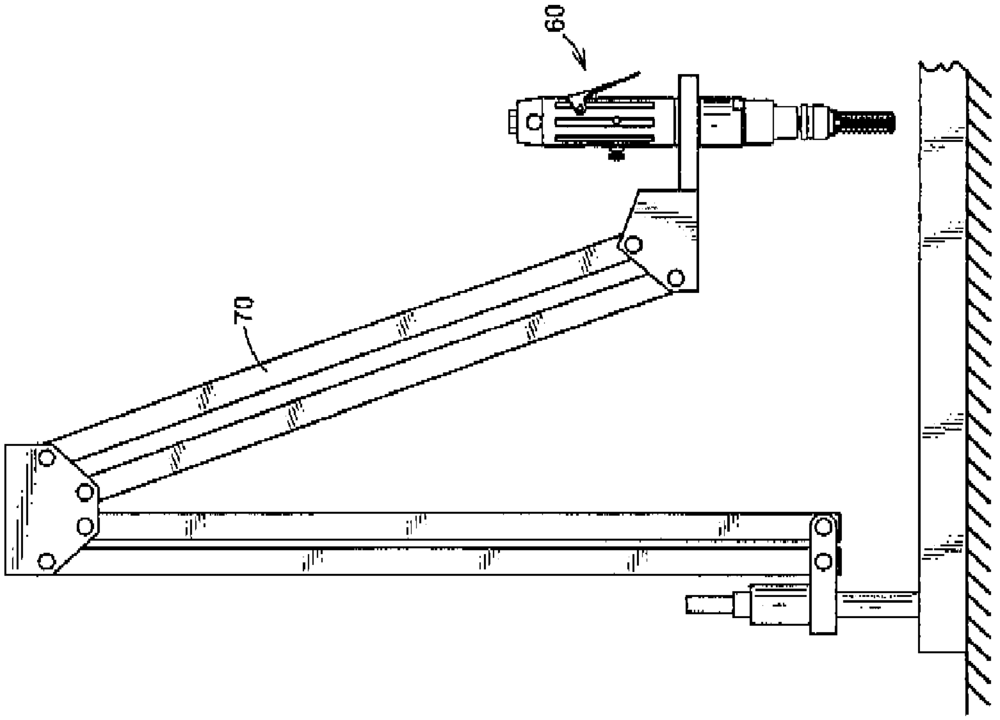
FIG. 5 PRIOR ART
FIG. 5 is an operational side view of the rotating power tool in FIG. 4 mounted in an articulated arm.

With reference to FIGS. 1, 2 and 3, a hand-held rotating power tool in accordance with the present invention comprises a body (10), a power unit, a transmission assembly (2) and a tool connector. The body (10) is hollow and has an open front end and an inner cavity. The power unit is mounted inside the inner cavity, may be an electric or pneumatic motor and has a rotating armature (20). The rotating armature (20) is mounted rotatably in and protrudes from the power unit and has a front end and a spindle (21). The spindle (21) is formed coaxially on and protrudes from the front end of the armature (20) and has a front end. The front end of the spindle (21) is flush with the open front end of the body (10). The tool connector protrudes coaxially from the front end of the body (10), holds a tool such as drill bit, a screwdriver tip, a sanding disk or the like and may be a socket, a chuck or the like.

The transmission assembly (2) comprises a transmission casing (11), a common annulus (30), at least two planetary gear assemblies (40, 50), a thrust washer assembly (55) and a bearing assembly.

The transmission casing (11) is hollow and cylindrical, is detachably mounted coaxially on and protrudes from the open front end of the body (10) and has a through hole.

The common annulus (30) is tubular, is mounted securely in the transmission casing (11) adjacent to the open front end of the body (10) and has an inner surface and multiple teeth. The teeth are formed longitudinally around the inner surface.

The at least two planetary gear assemblies (40, 50) are mounted in series in the common annulus (30), comprise a first stage planetary gear assembly (40) and a final stage planetary gear assembly (50) and may comprise additional intermediate planetary gear assemblies, and each planetary gear assembly (40, 50) has a rotational axis and comprises a sun gear (210, 413), a planet carrier (41, 51) and at least three planetary gears (42, 52).

The first stage planetary gear assembly (40) is connected to and rotated by the spindle (21) of the armature (20).

The final stage planetary gear assembly (50) is connected to and rotated by an adjacent planetary gear assembly.

The intermediate planetary gear assemblies are mounted in series between the first and final stage planetary gear assemblies (40, 50).

The sun gear (210, 413) is mounted coaxially on the rotational axis. The sun gear (210) of the first stage planetary gear assembly (40) is connected to and protrudes coaxially from the spindle (21) of the armature. The sun gear (413) of the final stage planetary gear assembly (50) is formed on and protrudes coaxially from the adjacent planetary gear assembly (40).

The planet carrier (41, 51) is an annular bracket, is mounted rotatably around the sun gear (210, 413) and has a front surface, a rear surface, an outer edge, a central hole, a front bearing mount and at least three gear recesses (410, 510). At least one of the planet carriers (51) further has a mounting recess (514) formed concentrically in the rear surface near the outer edge, and the planet carrier (41) of the first stage planetary gear assembly (40) further has a rear bearing mount. The central hole is formed concentrically in the rear surface and is mounted around the sun gear (210, 413). The front bearing mount is formed coaxially on and protrudes from the front surface. The gear recesses (410, 510) are evenly formed radially in the outer edge and communicate with the central hole, and each gear recess (410, 510) has two pinholes and a pivot pin (412, 512). The pinholes in each gear recess (410, 510) are formed respectively through the front and rear surfaces of the planet carrier (41, 51) and are aligned with each other. Each pivot pin (412, 512) is mounted longitudinally in a pair of aligned pinholes.

The planetary gears (42, 52) are mounted rotatably respectively around the pivot pins (412, 512) respectively in the gear recesses (410, 510) and engage the sun gear (210, 413) in the central hole and the teeth of the common annulus (30). The rotating sun gear (210, 413) rotates the planetary gears (42, 52) that cause the planet carrier (41, 51) to rotate because of the engagement of the planetary gears (42, 52) with the stationary common annulus (30).

The thrust washer assembly (55) is mounted between the first stage planetary gear assembly (40) and the adjacent planetary gear assembly (50) around the sun gear (413) of the adjacent planetary gear assembly (50) and in the mounting recess (514) in the planet carrier (51) of the adjacent planetary gear assembly (50) and has a resilient washer and one or more flat washers. The resilient washer absorbs movement in an axial direction, may be curved and has two sides. The flat washers are mounted respectively on the sides of the resilient washer.

The bearing assembly has a bearing bracket (46), a bearing (45) and a retaining ring (47). The bearing bracket (46) is mounted securely in the common annulus (30). The bearing (45) is mounted in the bearing bracket (46) and on the front bearing mount of the planet carrier (41, 51). The retaining ring (47) is mounted in the common annulus (30) and holds the bearing bracket (45) securely in the common annulus (30) and the bearing (45) in the bearing bracket (46).

The transmission assembly (2) has the advantages of providing smooth and stable operation and effectively isolating the rest of the hand-held rotating power tool from reactive forces. This prevents damage and ensures normal operation of the hand-held rotating power tool for an extended operational life.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A hand-held rotating power tool comprising a body being hollow and having an open front end and an inner cavity;

a power unit being mounted inside the inner cavity and having an armature being mounted rotatably in and protruding from the power unit; and a transmission assembly having a transmission casing being hollow and cylindrical, being detachably mounted coaxially on and protruding from the open front end of the body and having a through hole;

a common annulus being tubular, being mounted securely in the transmission casing adjacent to the open front end of the body and having an inner surface; and multiple teeth being formed longitudinally around the inner surface;

at least two planetary gear assemblies being mounted in series and comprising a first stage planetary gear assembly being connected to and rotated by the armature and a final stage planetary gear assembly, and each planetary gear assembly having a rotational axis and comprising a sun gear being mounted coaxially on the rotational axis, wherein the sun gear of the first stage planetary gear is connected to and protrudes coaxially from the spindle of the armature and the sun gear of the final stage planetary gear assembly is rotated by the armature;

a planet carrier being an annular bracket, being mounted rotatably around the sun gear and having a front surface, a rear surface, an outer edge, a central hole being formed concentrically in the rear surface and being mounted around the sun gear, and a front bearing mount being formed coaxially on and protruding from the front surface;

at least three gear recesses being evenly formed radially in the outer edge and communicating with the central hole, and each gear recess having two pinholes being formed respectively through the front and rear surfaces of the planet carrier and being aligned with each other and a pivot pin being mounted longitudinally in the aligned pinholes, wherein at least one of the planet carriers further has a mounting recess formed concentrically in the rear surface near the outer edge; and the planet carrier of the first stage planetary gear assembly further has a rear bearing mount; and at least three planetary gears being mounted rotatably respectively around the pivot pins respectively in the gear recesses and engaging the sun gear in the central hole and the teeth of the common annulus;

a thrust washer assembly being mounted between the first stage planetary gear assembly and an adjacent planetary gear assembly around the sun gear of the adjacent planetary gear assembly and in the mounting recess in the planet carrier of the adjacent planetary gear assembly and having a resilient washer absorbing movement in an axial direction and having two sides; and at least one flat washer being mounted respectively on at least one of the sides of the resilient washer; and a bearing assembly being mounted on the planet carrier and having a bearing being mounted securely in the common annulus and on the front bearing mount of the planet carrier.

2. The hand-held rotating power tool as claimed in claim 1, wherein the bearing assembly further comprises a bearing bracket being mounted securely in the common annulus; and the bearing is mounted in the bearing bracket and on the front bearing mount of the planet carrier.

3. The hand-held rotating power tool as claimed in claim 2, wherein the bearing assembly further has a retaining ring being mounted in the common annulus and holding the bearing bracket securely in the common annulus and the bearing in the bearing bracket.

* * * * *